US 6,629,700 B1

(12) United States Patent
Baptiste

(10) Patent No.: US 6,629,700 B1
(45) Date of Patent: Oct. 7, 2003

(54) GOOSENECK TRAILER HITCH OFFSET SYSTEM

(75) Inventor: Frank E. Baptiste, Cliff, NM (US)

(73) Assignee: PopUp Industries, Inc., Chanute, KS (US)

( * ) Notice: Subject to any disclaimer, the term of this patent is extended or adjusted under 35 U.S.C. 154(b) by 0 days.

(21) Appl. No.: 10/177,317

(22) Filed: Jun. 21, 2002

(51) Int. Cl.[7] ................................................ B62D 53/06
(52) U.S. Cl. ................................ 280/423.1; 280/511
(58) Field of Search .......................... 280/417.1, 425.2, 280/441.2, 423.1, 511, 512, 513

(56) References Cited

U.S. PATENT DOCUMENTS

| 2,628,106 | A | | 2/1953 | Sturwold | |
|---|---|---|---|---|---|
| 3,406,852 | A | | 10/1968 | Winckler | |
| 3,433,503 | A | | 3/1969 | Davis | |
| 3,796,444 | A | * | 3/1974 | Hixon | 280/483 |
| 3,889,978 | A | * | 6/1975 | Kann | 280/415.1 |
| 3,929,353 | A | | 12/1975 | Burleson et al. | |
| D243,000 | S | | 1/1977 | Carnes | |
| 4,256,323 | A | * | 3/1981 | McBride | 280/495 |
| 4,832,358 | A | * | 5/1989 | Bull | 280/418.1 |
| 5,145,199 | A | | 9/1992 | Howard | |
| 5,482,309 | A | | 1/1996 | Hollis | |
| 5,797,614 | A | * | 8/1998 | Hord et al. | 280/417.1 |
| 6,135,482 | A | * | 10/2000 | Larkin | 280/416.1 |
| 6,234,509 | B1 | * | 5/2001 | Lara | 280/425.2 |
| 6,398,250 | B1 | * | 6/2002 | Hashman | 280/438.1 |

* cited by examiner

Primary Examiner—AnneMarie Boehler
(74) Attorney, Agent, or Firm—Shook, Hardy & Bacon L.L.P.

(57) ABSTRACT

A gooseneck trailer hitch offset system for increasing the turning radius possible with a gooseneck trailer. The gooseneck trailer hitch offset system is most suitable for use with a vehicle having a bed that contains a hitch ball and a trailer with a cantilevered gooseneck section containing a down tube. The system includes a hitch offset assembly that offsets the axis of the down tube of the gooseneck section of the trailer from the axis of the hitch ball of the hitch of the towing vehicle. The hitch offset assembly comprises a coupler portion to couple to a hitch coupler device, an upright portion designed for coupling to the down tube of the gooseneck structure of the trailer hitch, and an offset portion that extends between the coupler portion and the upright portion.

12 Claims, 2 Drawing Sheets

GOOSENECK TRAILER HITCH OFFSET SYSTEM

BACKGROUND OF THE INVENTION

1. Field of the Invention

The present invention relates to gooseneck trailer hitch devices and more particularly pertains to a new gooseneck trailer hitch offset system for increasing the turning radius possible with a gooseneck trailer.

2. Description of the Prior Art

The use of gooseneck trailer hitch devices is known in the prior art. More specifically, gooseneck trailer hitch devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,406,852; U.S. Pat. No. 3,929,353; U.S. Pat. No. 5,482,309; U.S. Pat. No. 2,628,106; U.S. Pat. No. 5,145,199; U.S. Pat. No. Des. 243,000 and U.S. Pat. No. 3,433,503.

While these devices fulfill their respective, particular objectives and requirements, the aforementioned patents do not disclose a new gooseneck trailer hitch offset system. The inventive device is most suitable for use with a vehicle having a bed that contains a hitch ball and a trailer with a cantilevered gooseneck section containing a down tube. The system includes a hitch offset assembly that offsets the axis of the down tube of the gooseneck section of the trailer from the axis of the hitch ball of the hitch of the towing vehicle. The hitch offset assembly comprises a coupler portion to couple to a hitch coupler device, an upright portion designed for coupling to the down tube of the gooseneck structure of the trailer hitch, and an offset portion that extends between the coupler portion and the upright portion.

In these respects, the gooseneck trailer hitch offset system according to the present invention substantially departs from the conventional concepts and designs of the prior art, and in so doing provides an apparatus primarily developed for the purpose of increasing the turning radius possible with a gooseneck trailer.

SUMMARY OF THE INVENTION

In view of the foregoing disadvantages inherent in the known types of gooseneck trailer hitch devices now present in the prior art, the present invention provides a new gooseneck trailer hitch offset system construction wherein the same can be utilized for increasing the turning radius possible with a gooseneck trailer.

The general purpose of the present invention, which will be described subsequently in greater detail, is to provide a new gooseneck trailer hitch offset system apparatus and method which has many of the advantages of the gooseneck trailer hitch devices mentioned heretofore and many novel features that result in a new gooseneck trailer hitch offset system which is not anticipated, rendered obvious, suggested, or even implied by any of the prior art gooseneck trailer hitch devices, either alone or in any combination thereof.

To attain this, the present invention is most suitable for use with a vehicle having a bed that contains a hitch ball and a trailer with a cantilevered gooseneck section containing a down tube. The system includes a hitch offset assembly that offsets the axis of the down tube of the gooseneck section of the trailer from the axis of the hitch ball of the hitch of the towing vehicle. The hitch offset assembly comprises a coupler portion to couple to a hitch coupler device, an upright portion designed for coupling to the down tube of the gooseneck structure of the trailer hitch, and an offset portion that extends between the coupler portion and the upright portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new gooseneck trailer hitch offset system apparatus and method which has many of the advantages of the gooseneck trailer hitch devices mentioned heretofore and many novel features that result in a new gooseneck trailer hitch offset system which is not anticipated, rendered obvious, suggested, or even implied by any of the prior art gooseneck trailer hitch devices, either alone or in any combination thereof.

It is another object of the present invention to provide a new gooseneck trailer hitch offset system that may be easily and efficiently manufactured and marketed.

It is a further object of the present invention to provide a new gooseneck trailer hitch offset system which is of a durable and reliable construction.

An even further object of the present invention is to provide a new gooseneck trailer hitch offset system which is susceptible of a low cost of manufacture with regard to both materials and labor, and which accordingly is then susceptible of low prices of sale to the consuming public, thereby making such gooseneck trailer hitch offset system economically available to the buying public.

Still yet another object of the present invention is to provide a new gooseneck trailer hitch offset system which provides in the apparatuses and methods of the prior art some of the advantages thereof, while simultaneously overcoming some of the disadvantages normally associated therewith.

Still another object of the present invention is to provide a new gooseneck trailer hitch offset system for increasing the turning radius possible with a gooseneck trailer.

Yet another object of the present invention is to provide[ ]a new gooseneck trailer hitch offset system which is most suitable for use with a vehicle having a bed that contains a hitch ball and a trailer with a cantilevered gooseneck section containing a down tube. The system includes a hitch offset assembly that offsets the axis of the down tube of the gooseneck section of the trailer from the axis of the hitch ball of the hitch of the towing vehicle. The hitch offset assembly comprises a coupler portion to couple to a hitch coupler device, an upright portion designed for coupling to the down tube of the gooseneck structure of the trailer hitch, and an offset portion that extends between the coupler portion and the upright portion.

Still yet another object of the present invention is to provide a new gooseneck trailer hitch offset system that allows for better maneuverability of the trailer while driving the vehicle.

Even still another object of the present invention is to provide a new gooseneck trailer hitch offset system that distributes the weight from the trailer ahead of the rear axle of the towing vehicle, thus better balancing the trailer's load.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
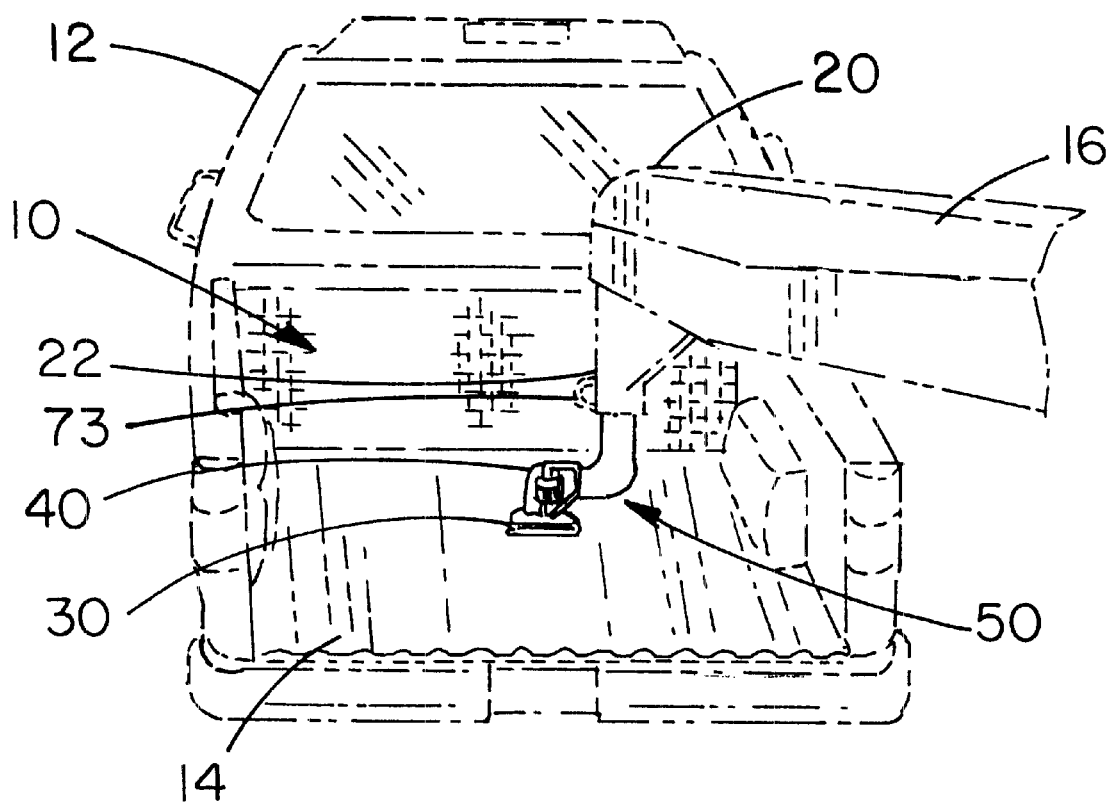
FIG. 1 is a schematic perspective view of a new gooseneck trailer hitch offset system according to the present invention.
Figure 2:
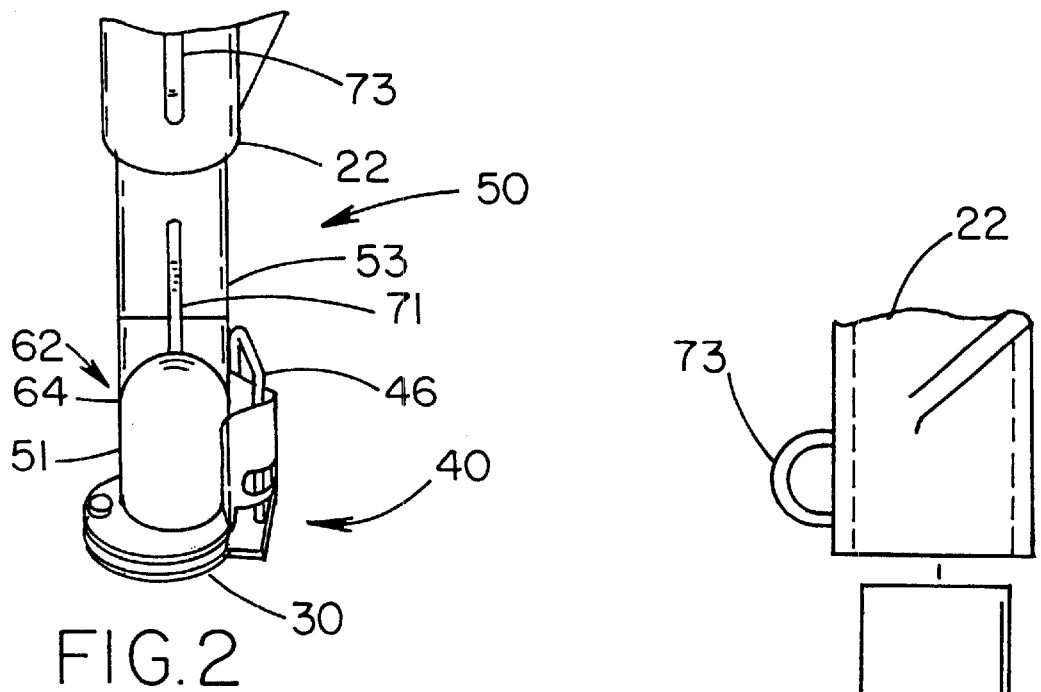
FIG. 2 is a schematic front view of the present invention.
Figure 3:
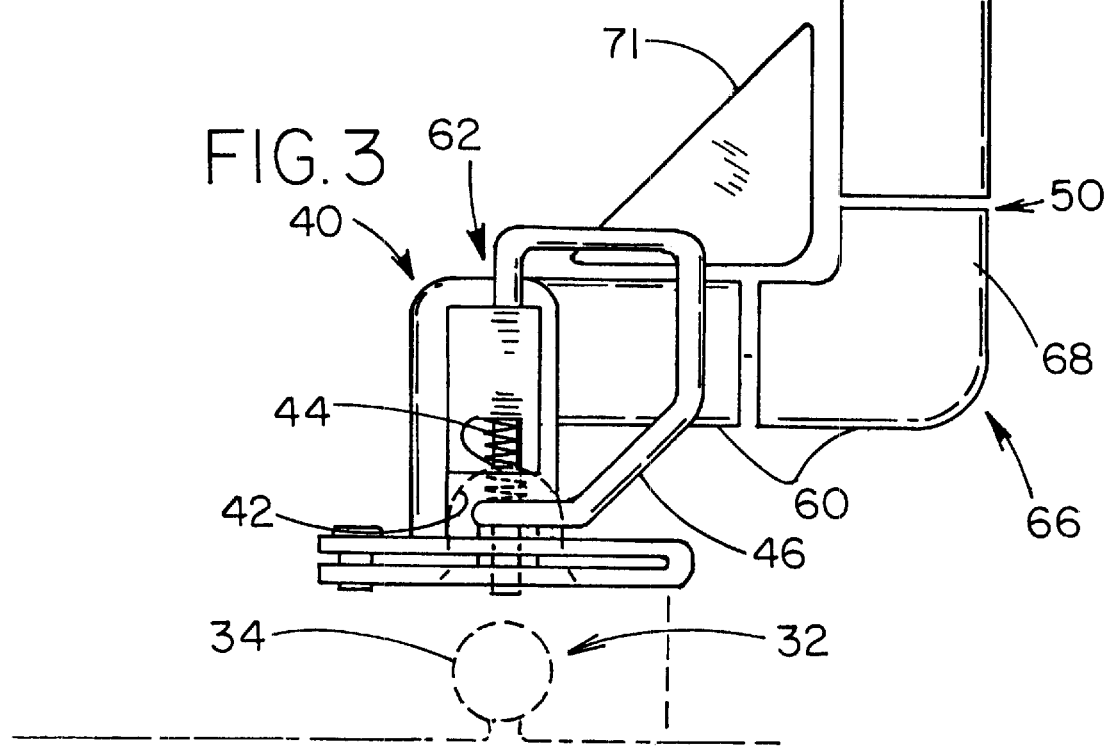
FIG. 3 is a schematic side view of the present invention.

With reference now to the drawings, and in particular to FIGS. 1 through 3 thereof, a new gooseneck trailer hitch offset system embodying the principles and concepts of the present invention and generally designated by the reference numeral 10 will be described.

As best illustrated in FIGS. 1 through 3, the gooseneck trailer hitch offset system 10 is suitable for use with a vehicle 12 that includes a bed 14 having a hitch typically including a hitch ball 34. A suitable trailer 16 for use with the system has a cantilevered gooseneck section 20 containing a down tube 22 which conventionally receives a hitch engaging assembly 30, including a hitch coupler device 40 for coupling to the hitch ball 34. The invention includes a hitch offset assembly 50 for offsetting the axis of the trailer 16 attached to the cantilevered gooseneck section 20.

A typical hitch ball 34 is mounted on the bed 14 of a vehicle 12. A trailer 16 includes a cantilevered gooseneck section 20 designed with a down tube 22 for receiving a hitch engaging assembly 30. Illustratively, the down tube 22 may have a diameter of approximately four (4) inches and may be approximately two (2) feet in length.

A hitch engaging assembly 30 is associated with the trailer 16 for engaging the hitch 34 of the vehicle 12. The hitch engaging assembly 30 includes a hitch coupler device 40 for receiving the hitch ball 34 of a hitch. The hitch coupler device 40 includes a ball receiving recess 42, a pin latch mechanism 44 for selectively holding a hitch ball 34 in the ball receiving recess 42, and a coupler release lever 46 for releasing the pin latch mechanism 44 and, thus, releasing a hitch ball 34 received in the ball receiving recess 42. A suitable hitch coupler device 30 is available under the tradename "Bulldog" from the Hammerblow company of El Paso Tex., although other devices may be used.

Significantly, a hitch offset assembly 50 offsets the generally vertical axis of the down tube 22 of the gooseneck section 20 of the trailer 16 from the generally vertical axis of the hitch ball 34 of the hitch of the towing vehicle 12. The hitch offset assembly 50 comprises a coupler portion 51, an upright portion 53, and an offset portion 60. The coupler portion 51 is coupled to the hitch coupler device 40 such that the coupler portion 51 extends upwardly from the hitch coupler device 40 along the axis of the hitch ball 34 when the hitch ball 34 is received in the hitch coupler device 40. The coupler portion 51 is generally vertically oriented and preferably is tubular so that the hitch coupler device 40 may be received in the interior of the coupler portion 51.

The upright portion 53 is coupled to the down tube 22 of the gooseneck structure of a trailer 16, and may be inserted into the down tube. The upright portion may be generally oriented in an upright position. In one embodiment, the upright portion is tubular.

The offset portion 60 extends between the coupler portion 51 and the upright portion 53. The offset portion may be oriented generally horizontally. A first end 62 of the offset portion 60 includes a first elbow 64 connected to the coupler portion 51, and a second end 66 of the offset portion 60 includes a second elbow 68 connected to the upright portion 53. The offset portion 60 may thus be oriented substantially perpendicular to the coupler portion 51 and to the offset portion 60. The upright portion 53 and the coupler portion 51 may be oriented substantially parallel to each other such that the axis of the portions 51 and 53 are oriented substantially parallel to each other. In one embodiment, the offset portion 60 may have a diameter of approximately four (4) inches and is constructed of a pair of tight ninety (90) degree Schedule 80 high pressure gas fittings that are connected together in a suitable manner, preferably by welding. Preferably, the hitch offset assembly 50 offsets the axis of the down tube 22 of the trailer 16 approximately five to twelve inches from the axis of the hitch ball 34. Most ideally, the hitch offset assembly 50 offsets the axis of the down tube 22 of the trailer 16 approximately seven inches from the axis of the hitch ball 34.

A gusset 71 may be provided that extends between the offset portion 60 and the upright portion 53 for strengthening the hitch offset assembly 50. Illustratively, the gusset 71 may be approximately three-eighths (3/8) of an inch in thickness for sufficient support. An eyelet 73 may be mounted on the upright portion 53 to be linked to a safety chain.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch offset system for mounting on a trailer having a gooseneck structure with a down tube for engaging a hitch of a vehicle, the hitch engaging system comprising:
   a hitch offset assembly for offsetting the axis of the down tube from the axis of the hitch ball of the hitch of the towing vehicle, the hitch offset assembly comprising:
      a coupler portion for coupling to a hitch coupler device;
      an upright portion for coupling to the down tube of the trailer; and
      an offset portion extending between the coupler portion and the upright portion; and
   a hitch coupler device for receiving the hitch ball of a hitch, the hitch coupler device being mounted on the coupler portion of the hitch offset assembly;
   wherein the coupler portion and the upright portions extending from the offset portion in substantially opposite directions, the coupler portion extending from the offset portion in a direction substantially perpendicular to a longitudinal axis of the offset portion such that the hitch coupler device mounted on the coupler portion extends downwardly from the offset portion to thereby raise the offset portion above an uppermost extent of the hitch ball of the hitch when the hitch coupler device is mounted on the hitch balls;
   wherein the hitch offset assembly is adapted to offset the axis of the down tube of the trailer approximately seven inches from the axis of the hitch ball.

2. The hitch offset system of claim 1 additionally comprising a gusset extending between the offset portion and the upright portion for strengthening the hitch offset assembly.

3. The hitch offset system of claim 1 wherein the hitch coupler device comprises a ball receiving recess, a pin latch mechanism for selectively holding a hitch ball in the ball receiving recess, and a coupler release lever for releasing the pin latch mechanism and releasing a hitch ball received in the ball receiving recess.

4. The hitch offset system of claim 1 wherein the coupler portion is adapted to extend upwardly from the hitch coupler device along the axis of the hitch ball when the hitch ball is received in the hitch coupler device.

5. The hitch offset system of claim 1 wherein the coupler portion is oriented generally vertical.

6. The hitch offset system of claim 1 wherein the coupler portion is substantially tubular.

7. The hitch offset system of claim 1 wherein the upright portion is oriented generally upright.

8. The hitch offset system of claim 1 wherein the upright portion is substantially tubular.

9. The bitch offset system of claim 1 wherein the offset portion is oriented generally horizontal, a first end of the offset portion having a first elbow connected to the coupler portion, a second end of the offset portion having a second elbow connected to the upright portion.

10. The hitch offset system of claim 1 wherein the offset portion is oriented substantially perpendicular to the coupler portion and to the offset portion.

11. The hitch offset system of claim 1 wherein the upright portion and the coupler portion are oriented substantially parallel to each other.

12. A hitch offset system comprising:
   a vehicle having a bed;
   a hitch including a hitch ball, the hitch being mounted on the bed of the vehicle;
   a trailer leaving a cantilevered gooseneck structure with a down tube for receiving a hitch engaging assembly;
   a hitch engaging assembly mounted on the trailer at the down tube for engaging the hitch of the vehicle, the hitch engaging assembly comprising:
      a hitch coupler device for receiving the hitch ball of a hitch, the hitch coupler device having a ball receiving recess, a pin latch mechanism for selectively holding a hitch ball in the ball receiving recess, a coupler release lever for releasing the pin latch mechanism and releasing a hitch ball received in the ball receiving recess;
      a hitch offset assembly for offsetting the axis of the down tube of the gooseneck section of the trailer from the axis of the hitch ball of the hitch of the towing vehicle, the hitch offset assembly comprising:
         a coupler portion coupled to the hitch coupler device such that the coupler portion extends upwardly from the hitch coupler device along the axis of the hitch ball when the hitch ball is received in the hitch coupler device, the coupler portion being oriented generally vertical, the coupler portion being tubular;

an upright portion for coupling to the gooseneck structure of a trailer, the upright portion being coupled to the down tube of the gooseneck, the upright portion being oriented generally upright, the upright portion being tubular; and an offset portion extending between the coupler portion and the upright portion, the offset portion being oriented generally horizontal, a first end of the offset portion having a first elbow connected to the coupler portion, a second end of the offset portion having a second elbow connected to the upright portion, wherein the offset portion is oriented substantially perpendicular to the coupler portion and to the offset portion, wherein the upright portion and the coupler portion are oriented substantially parallel to each other;

wherein the coupler portion and the upright portions extending from the offset portion in substantially opposite directions, the coupler portion extending from the offset portion in a direction substantially perpendicular to a longitudinal axis of the offset portion such that the hitch coupler device mounted on the coupler portion extends downwardly from the offset portion to thereby raise the offset portion above an uppermost extent of the hitch ball of the hitch when the hitch coupler device is mounted oni the hitch ball;

wherein the hitch offset assembly offsets the axis of the down tube of the trailer approximately five to twelve inches from the axis of the hitch ball;

a gusset extending between the offset portion and the upright portion for strengthening the hitch offset assembly.

* * * * *